(12) United States Patent
Shibata

(10) Patent No.: US 12,500,010 B2
(45) Date of Patent: Dec. 16, 2025

(54) FLAT CABLE HAVING CONDUCTIVE THIN PLATE COVERED WITH AN INSULATING LAYER

(71) Applicants: KOUMEICAN Co., Ltd., Osaka (JP); Yoshihiro Niijima, Osaka (JP)

(72) Inventor: Hitoshi Shibata, Osaka (JP)

(73) Assignees: KOUMEICAN CO., LTD., Osaka (JP); Yoshihiro Niijima, Osaka (JP)

( * ) Notice: Subject to any disclaimer, the term of this patent is extended or adjusted under 35 U.S.C. 154(b) by 208 days.

(21) Appl. No.: 18/263,545

(22) PCT Filed: Dec. 28, 2021

(86) PCT No.: PCT/JP2021/048841
§ 371 (c)(1),
(2) Date: Jul. 31, 2023

(87) PCT Pub. No.: WO2023/127114
PCT Pub. Date: Jul. 6, 2023

(65) Prior Publication Data
US 2024/0112830 A1 Apr. 4, 2024

(51) Int. Cl.
*H01B 7/08* (2006.01)
*H01B 7/18* (2006.01)

(52) U.S. Cl.
CPC .......... *H01B 7/08* (2013.01); *H01B 7/18* (2013.01)

(58) Field of Classification Search
CPC ...... H01B 7/08; H01B 7/0823; H01B 7/0216; H01B 7/18; H01B 11/1066

USPC ........................................................ 174/72 R
See application file for complete search history.

(56) References Cited

U.S. PATENT DOCUMENTS

| | | | | |
|---|---|---|---|---|
| 3,576,723 A * | 4/1971 | Angele et al. | ....... | H01B 7/0838 174/117 FF |
| 4,783,579 A * | 11/1988 | Brandolf | ................ | B29C 48/12 174/120 SR |
| 5,003,126 A * | 3/1991 | Fujii | .................... | G02B 6/4403 174/117 FF |
| 5,180,885 A | 1/1993 | Shah | | |
| 7,154,044 B2 * | 12/2006 | Horikoshi | ................ | C25D 5/50 174/117 FF |

(Continued)

FOREIGN PATENT DOCUMENTS

| | | |
|---|---|---|
| DE | 102006005097 A1 | 8/2007 |
| JP | 2-201820 A | 8/1990 |

(Continued)

*Primary Examiner* — Timothy J Thompson
*Assistant Examiner* — Michael F Mcallister
(74) *Attorney, Agent, or Firm* — Renner, Otto, Boisselle & Sklar, LLP

(57) ABSTRACT

A flat cable having high performances in current-carrying, insulation, and safety is provided. The flat cable 1, comprises: a pair of conductive thin plates 2 of strip-shape arranged in parallel; an insulating layer 3 covering the conductive thin plates 3; and a sheath protective layer 4 covering the conductive thin plates 2 covered with the insulating layer 3. The conductive thin plate 2 has a thickness of 0.6 mm or less and a cross-sectional width of 4 mm or more. the insulating layer 3 has a thickness of 0.25 mm or more, the sheath protective layer 4 has a thickness of 0.25 mm or more, and the flat cable has a total thickness of 2 mm or less and a cross-sectional total width of 20 mm or more.

5 Claims, 2 Drawing Sheets

(56) References Cited

U.S. PATENT DOCUMENTS

| | | | | |
|---|---|---|---|---|
| 10,804,011 B2 * | 10/2020 | Suzuki | ............... | G02B 6/4436 |
| 2005/0077074 A1 * | 4/2005 | Tanaka | ............... | H01B 7/0009 |
| | | | | 174/117 F |
| 2006/0249298 A1 * | 11/2006 | Reece | ............... | H01B 13/145 |
| | | | | 174/110 R |
| 2010/0044071 A1 | 2/2010 | Murao et al. | | |
| 2014/0131064 A1 * | 5/2014 | Yamada | ............... | H01B 13/14 |
| | | | | 427/117 |

FOREIGN PATENT DOCUMENTS

| | | | |
|---|---|---|---|
| JP | 668929 | B2 | 8/1994 |
| JP | 5309766 | B2 | 10/2013 |
| JP | 2019216036 | A | 12/2019 |
| WO | 2018034098 | A1 | 2/2018 |

* cited by examiner

FLAT CABLE HAVING CONDUCTIVE THIN PLATE COVERED WITH AN INSULATING LAYER

This application is a national phase of International Application No. PCT/JP2021/048841 filed Dec. 28, 2021, which is hereby incorporated herein by reference in its entirety.

TECHNICAL FIELD

The present invention relates to a flat cable in which a conductive thin plate is covered with an insulating layer.

BACKGROUND ART

Flat cables are used for various wiring, for example, in moving parts such as automobile roofs and doors, by utilizing the flexibility derived from their thinness compared to ordinary cables with a substantially circular cross section. Further, since flat cables can be wound, they are used for internal wiring of electronic devices such as a scanner head and a printer head (see, for example, Patent Document 1).

In this way, flat cables are used in a wide variety of fields and most of them are used for dedicated wiring as described above, on the other hand, ordinary cables of circular cross sections are still overwhelmingly used for power cords and extension cords of electrical equipment in general households.

However, ordinary cables may not be used for wiring in narrow places due to their thickness. Further, for example, even if an ordinary cable is laid and hidden under a carpet or the like, the portion where the cable is located swells, creating a step, which is unattractive and may cause a person to trip over the step. Flat cables, on the other hand, can be wired in places such as clearance gaps of doors or window frames where the ordinary cables cannot be wired, and the flat cables can contribute to increasing the degree of freedom in interior design. Moreover, if the cable is a flat cable, difference in level is scarcely made and no unsightly appearance due to the wiring is made. Therefore, it is considered that there is sufficient demand for replacement of general cables having a substantially circular cross section with flat cables.

PRIOR ART DOCUMENTS

Patent Documents

Patent Document JP5309766B

DISCLOSURE OF THE INVENTION

However, in order to replace ordinary cables of circular cross section with flat cables, electrical conductive performance and insulation equivalent to those of the 100V power cables widely used in households are required, and safety is required which satisfies certification standards such as UL standards.

An object of the present invention is to solve the above problems, and to provide a flat cable with high current-carrying performance, high insulation, and high safety equivalent to those of conventional power cables.

In order to solve the above problems, a flat cable according to the present invention comprises:
 a plurality of conductive thin plates of strip-shape arranged in parallel;
 an insulating layer covering the conductive thin plate; and
 a sheath protective layer covering the conductive thin plates covered with the insulating layer, wherein
 the conductive thin plate has a thickness of 0.6 mm or less and a cross-sectional width of 4 mm or more,
 the insulating layer has a thickness of 0.25 mm or more,
 the sheath protective layer has a thickness of 0.25 mm or more, and
 the flat cable is characterized by a total thickness of 3 mm or less and a cross-sectional total width of 20 mm or more.

In the above flat cable, it is preferable that the insulating layer comprises:
 a first insulating layer covering each of the plurality of conductive thin plates individually; and
 a second insulating layer covering the conductive thin plates individually covered with the first insulating layer, wherein
 the second insulating layer is a layer made by extrusion molding on the plurality of conductive thin plates arranged in parallel.

In the above flat cable, it is preferable that the first insulating layer is a resin covering having a thickness of 0.1 mm or less.

In the above flat cable, it is preferable that the conductive thin plate is made of oxygen-free copper.

In the above flat cable, it is preferable to further comprise a carbon covering covering an outside surface of the sheath protective layer.

According to the present invention, by setting the plate thickness and cross-sectional width of the conductive thin plate as described above, it is possible to obtain a high current-carrying performance equivalent to that of a conventional power cable, and by setting the thickness of the protective layer as described above, high insulation and high safety can be achieved.

MODE FOR CARRYING OUT THE INVENTION

Figure 1:
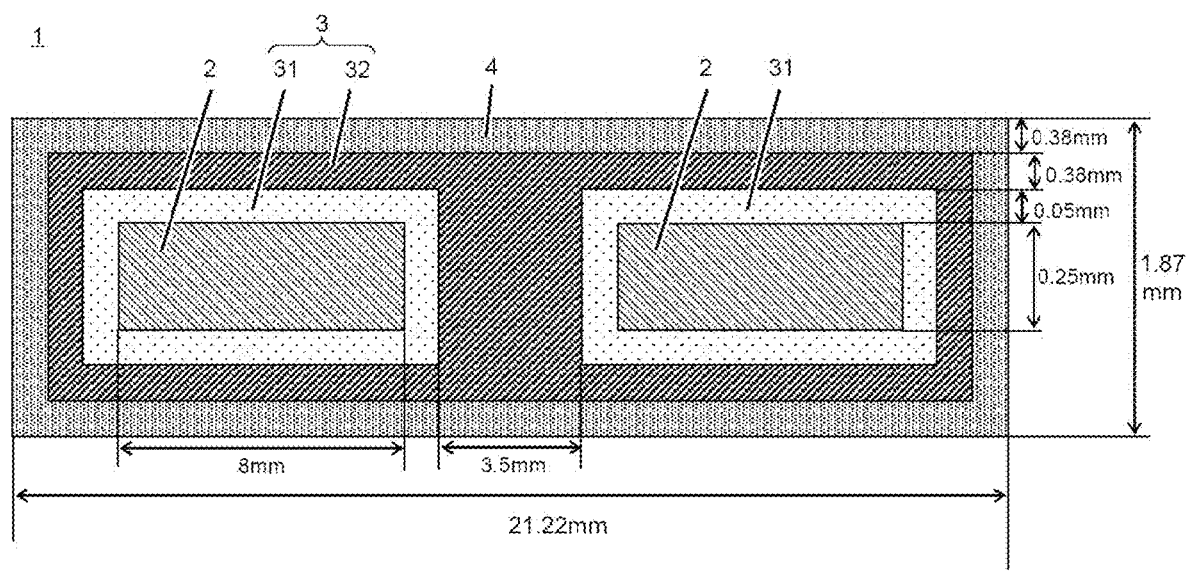
FIG. 1 is a cross-sectional view of a flat cable according to an embodiment of the present invention.

A flat cable according to one embodiment of the present invention will be described with reference to the drawings. As shown in FIG. 1, a flat cable 1 comprises a pair of conductive thin plates 2 of strip-shape arranged in parallel, an insulating layer 3 covering the conductive thin plates 2, and a sheath protective layer 4 covering the pair of conductive thin plates 2 covered with the insulating layer 3. The insulating layer 3 includes a first insulating layer 31 that covers the pair of conductive thin plates 2 individually, and a second insulating layer 32 that covers the pair of conductive thin plates 2 covered with the first insulating layer 31. Note that the shape shown in FIG. 1 is an example of the constituent elements of the flat cable 1, and does not represent the actual dimensions or the ratio of each constituent element.

The conductive thin plate 2 preferably has a plate thickness of 0.6 mm or less and a cross-sectional width of 4 mm or more, and more preferably has a plate thickness of 0.4 mm or less and a cross-sectional width of 6 mm or more. The illustrated conductive thin plate 2 has a plate thickness of 0.25 mm and a cross-sectional width of 8 mm. In this way, by reducing the plate thickness of the conductive thin plate 2, the flat cable 1 itself can be made thinner, and by increasing the cross-sectional width, high conductivity can be secured.

However, if the plate thickness of the conductive thin plate 2 is 0.1 mm or less, the conductive thin plate 2 is likely to be damaged by, for example, pressing force from the outside. Further, when the cross-sectional width of the conductive thin plate 2 increases, the overall width of the flat cable 1 itself also increases. On the other hand, if the plate thickness is 0.6 mm or more, the flat cable 1 itself becomes thick, and the thinness, i.e. the original advantage of the flat cable, deteriorates, and also the flexibility decreases. Therefore, the thickness of the conductive thin plate 2 is preferably 0.1 to 0.6 mm, and the cross-sectional width of the conductive thin plate 2 is preferably 4 to 10 mm corresponding to the plate thickness.

For example, copper, pure silver, gold, aluminum, carbon nanotube, etc. can be used as the material that constitutes the conductive thin plate 2. The carbon nanotubes have extremely high electrical conductivity, are lightweight and tough, and have excellent elasticity and resilience, and therefore, flat cables using carbon nanotubes for the conductive thin plate 2 can be expected to be used in a wide variety of fields. However, when such a material is used, as with pure silver and gold, the unit price of the product rises, so it is preferable to use copper, which has high conductivity and is inexpensive, for the conductive thin plate 2.

Oxygen-free copper is used for the conductive thin plate 2 of this embodiment. Oxygen-free copper is generally high-purity copper of 99.96% or more that does not contain oxides, and is regulated by Japanese Industrial Standards and the like. Oxygen-free copper has less resistance and distortion and is industrially superior than tough-pitch copper with a purity of about 99.90% widely used as a cable conductor. Therefore, the flat cable 1 using oxygen-free copper for the conductive thin plate 2 can be used not only for power cables but also for signal cables that avoid resistance and distortion components, and can be applied particularly and suitably to speaker cables.

The insulating layer 3 preferably has a thickness of 0.25 mm or more, and in the insulating layer 3 illustrated in the figure, the thickness of the first insulating layer 31 is 0.05 mm, the thickness of the second insulating layer 32 is 0.38 mm, and thus the thickness of the insulating layer is 0.43 mm. By making the thickness 0.25 mm or more for the insulating layer 3, the required insulation can be achieved and safety can be obtained which satisfy the certification standard of the UL standard (for example, an electrical insulation system that can withstand tests and evaluations based on UL1446). The UL standard is a product safety standard established by the U.S. certification body "Underwriters Laboratories Inc. (UL)", and for example, products, meeting the certification standards of UL1446, use a combination of electrical insulating materials having high heat resistance in order to ensure that electrical insulation functions correctly even when they interact with each other under being exposed to heat.

The first insulating layer 31 is preferably a resin covering with a thickness of 0.1 mm or less. The thickness of the first insulating layer 31 illustrated is 0.05 mm. A nylon covering is used for the first insulating layer 31 illustrated. Nylon has mechanical, thermal, and chemical properties as well as excellent electrical properties, so it is often used as a general insulating material for connectors, coil bobbins, etc. and can provide required insulation even a thickness of 0.05 mm. In addition, since the nylon covering has a heat resistance temperature of 200° C. or more, the flat cable 1 of excellent heat resistance can be realized. Note that the first insulating layer 31 may be made of a fluororesin or the like having a heat resistance equal to or higher than that of nylon.

In addition, in the present embodiment, since the conductive thin plates 2 in pairs arranged in parallel are each covered with the first insulating layer 31, they are insulated easily and securely from each other even if the conductive thin plates 2 in pairs are arranged close to each other. In this embodiment, the distance between the conductive thin plates 2 in pairs is set to 3.5 mm, and even with this distance, sufficient insulation can be obtained and the flat cable 1 of less prone to short circuits can be realized. Note that the distance between the conductive thin plates 2 in pairs may be narrower, and may be, for example, 3 mm or less. Thereby, the overall width of the flat cable 1 can be reduced.

For the second insulating layer 32, a resin material with excellent characteristics of workability, bending resistance, adhesiveness and heat resistance is adopted. Examples of such resin materials include polymer materials such as polyvinyl chloride, polyethylene, polypropylene, polystyrene, and polyethylene terephthalate. In particular, the material used for the second insulating layer 32 is desirably a material having heat resistance equivalent to or higher than that of the nylon covering of the first insulating layer 31, and by using such materials, products that meet certification standards can be obtained. Vinyl chloride is used for the second insulating layer 32 illustrated in the figure, but it is not limited to this, and for example, a mixed resin material in which urethane resin is mixed with vinyl chloride may be used.

As will be described later, the second insulating layer 32 is made by extrusion molding to cover the pair of conductive thin plates 2 arranged in parallel (each plate is previously covered with the first insulating layer 31). In other words, the second insulating layer 32 serves as a spacing member that holds the spacing between the conductive thin plates 2 in pairs and also serves as an insulating member for preventing short circuits.

The thickness of the sheath protective layer 4 is preferably 0.25 mm or more, and the thickness of the sheath protective layer 4 illustrated in the figure is 0.38 mm. The sheath protective layer 4 works as a shock-absorbing protective material for protecting the conductive thin plate 2 from external pressure and the like. The same material as the second insulating layer 32 may be used for the sheath protective layer 4, but a material with better cushioning protection is preferable, and for example, thermoplastic elastomer (TPE) has rubber-like elasticity at room temperature, is light and strong, and is suitably used as the sheath protective layer 4.

The flat cable 1 made of the above materials preferably has a total thickness of 3 mm or less and a cross-sectional total width of 20 mm or more. The flat cable 1 illustrated in the figure has a thickness of 1.87 mm and a total width of 21.22 mm. These thickness and total width make it possible to obtain a flat cable that can be used in a wide variety of fields. In addition, by setting the plate thickness and cross-sectional width of the conductive thin plate 2 as described above, it is possible to obtain a high current-carrying performance equivalent to that of a conventional power cable, and also by setting the thickness of the sheath protective layer 4 as described above, high insulation and high safety can be achieved. In addition, since the sheath protective layer 4 also contributes to an improvement in heat resistance, the flat cable 1 is suitably used for wiring equipment related to automobiles such as electric cars and hybrid cars.

Figure 2:
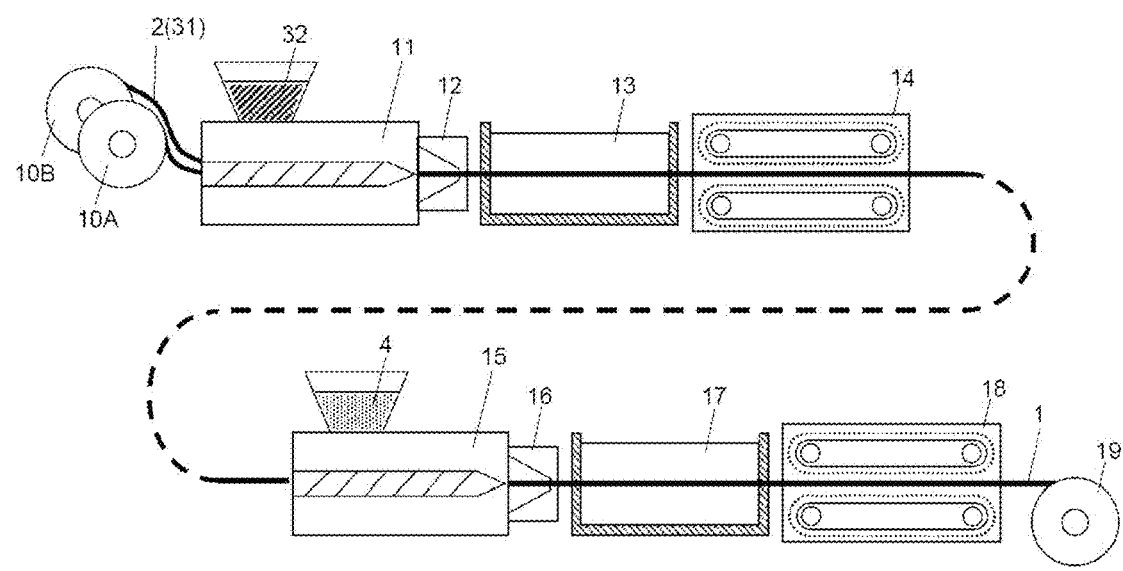
FIG. 2 is a diagram for explaining the manufacturing method of the flat cable.

Next, a method for manufacturing the flat cable 1 of this embodiment will be described with reference to FIGS. 2 to 4. As shown in FIG. 2, rolls 10A and 10B of the conductive thin plates 2 (copper thin plates) covered with the first insulating layer 31 (nylon covering) are prepared, and the conductive thin plates 2 arranged in parallel are inserted from their tips into a first extruder 11. The first extruder 11 comprises a material feeding section for feeding the resin material into the apparatus, a compression section for melting the resin material, and a weighing section for liquefying the resin material and conveying the material to a mold 12. A resin material (vinyl chloride) forming the second insulating layer 32 is supplied to the material feeding section of the first extruder 11. The resin material is melt in a liquid state and extruded into the mold 12 to cover the conductive thin plates 2.

Figure 3:
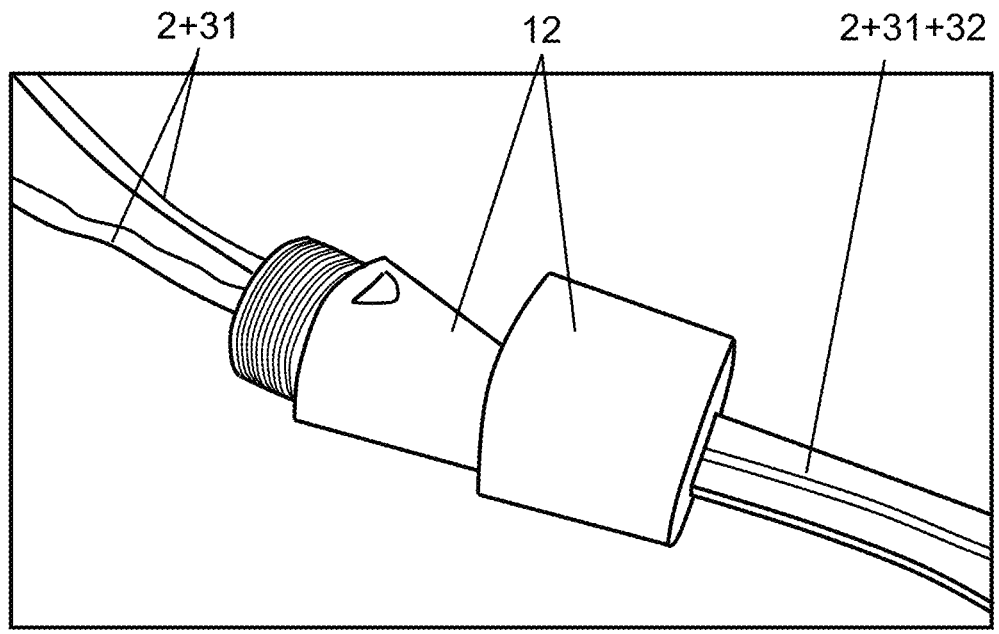
FIG. 3 is a photograph of a mold used in an extruder to cover the second insulating layer.
Figure 4:
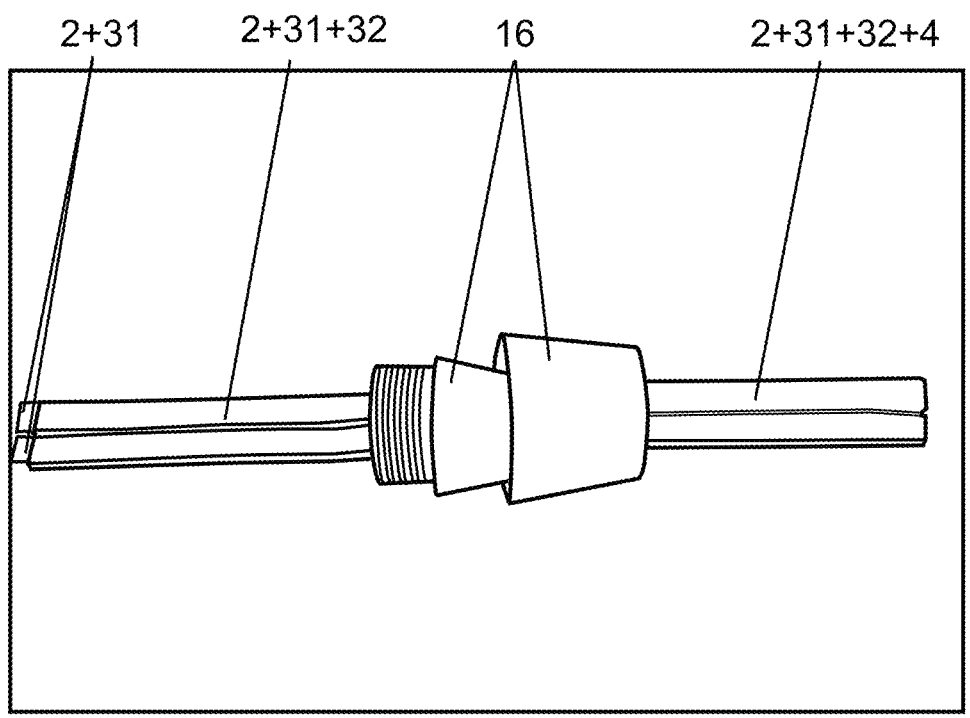
FIG. 4 is a photograph of a mold used in an extruder to cover the sheath protective layer.

FIG. 3 is a photograph of the actual mold 12. The mold 12 comprises a feed side mold (left in the photo) to which the conductive thin plates are supplied and a delivery side mold (right in the photo) from which the covered conductive thin plate 2 is delivered, wherein the resin material melted in a liquid state is extruded into a space provided between the feed side mold and the delivery side mold, and the conductive thin plates 2 are conveyed from the feed side mold, and thereby the conductive thin plates 2 is covered with the resin material forming the second insulating layer 32. The feed side mold has a shape tapering in a feeding direction of the conductive thin plate 2, and at the tip portion of the feed side mold, two supply ports (not shown) are provided, wherein the conductive thin plates 2 are fed from these supply ports, respectively, while maintaining a constant spacing between them. The conductive thin plates 2 covered in bunch with the second insulating layer 32 is transported to a cooling tank 13 filled with cooling water, and then transported to a receiver 14 after cooling. The receiver 14 applies pressure in the direction different from that of the extruder 11 to prevent the generation of voids at the edge portions.

Subsequently, the conductive thin plates 2 covered with the second insulating layer 32 are passed through a second extruder 15. A resin material (TPE) forming the sheath protective layer 4 is supplied to a material feeding section of the second extruder 15. The resin material forming the sheath protective layer 4 is melted in a liquid state and extruded into a mold 16 to further cover the second insulating layer 32 covering the conductive thin plates 2. FIG. 4 is a photograph of the actual mold 16, and at the tip portion of a feed side mold on the left side in the photo, one supply port (not shown) is provided for the conductive thin plates 2 already covered with the second insulating layer 32. The conductive thin plates 2 covered with the sheath protective layer 4 by the second extruder 15 are transported to a cooling tank 17 filled with cooling water, further adjusted in dimension by a receiver 18, and collected by a roll 19 as a product.

According to the above manufacturing method, a flat cable 1 with a very long length can be manufactured easily. Since the flat cable 1 manufactured by this manufacturing method can be wound up, it can be suitably used as an extension cable. In addition, since a product excellent in waterproofness and dustproofness can be obtained, the product is also suitable for outdoor use and can be applied to wiring facilities of solar panels.

The insulation resistance and conductor resistance of the flat cable 1 manufactured as described above were tested. In the insulation resistance test, after immersing a sample in water for 1 hour, a voltage of 1500V was applied between the conductors and the ground, and resistance values at 20° C. were obtained and evaluated. The conductor resistance test was also performed by measuring the resistance values of the sample conductors under the same conditions as above. The sample was different from the one shown in FIG. 1, in the sample, the conductive thin plates 2 did not have the first insulating layer 31, and the other configuration shown in FIG. 1 was used, in which the conductive thin plates 2 have a thickness of 0.25 mm and a width of 8 mm. The sample length was 50 m.

Generally, the insulation resistance of a flat cable is required to be 10 M$\Omega$·km or more, and the insulation resistance of the flat cable 1 of the sample was 89.125 to 117.8 M$\Omega$·km. In addition, the conductor resistance is required to be 8.92 $\Omega$/km or less, and the conductor resistance of the flat cable 1 of the sample was 8.764 to 8.768 $\Omega$/km. Therefore, it was shown that the flat cable 1 of this embodiment satisfies the standards for both insulation resistance and conductor resistance, and has the required performance for a power cable.

Here, a modification of the above embodiment will be described. The flat cable 1 according to this modified example (not shown) has a carbon covering on the outside surface of the sheath protective layer 4. Other configurations are the same as those of the above embodiment. The thickness of the carbon covering is preferably 0.25 mm or more, for example, 0.38 mm like the sheath protective layer 4 described above. The carbon covering is composed of, for example, a polymer resin layer containing carbon nanotubes or carbon black. By applying such a carbon covering, discharge of electric charges from the surface of the cable is promoted, ill effect of static electricity is reduced, signal transmission performance is improved, and a flat cable more suitable for speaker cable, for example, can be obtained.

The present invention is not limited to the configuration of the above embodiment, and various modifications may be possible. In the above embodiment, the conductive thin plates 2 of two in pair are arranged in parallel, but the number of the conductive thin plates 2 is not limited to two, and may be three or more, and for example, in the case of a signal cable, it may be four or more. For example, when four conductive thin plates 2 are comprised, the four may be arranged side by side or may be arranged in a 2×2 arrangement. Alternatively, the first insulating layer 31 may not be provided, and the first insulating layer 31 may be provided only on a part of the surface of the conductive thin plate 2 rather than on the entire outer peripheral surface thereof.

EXPLANATIONS OF LETTERS OR NUMERALS

1 Flat cable
2 Conductive thin plate
3 Insulating layer
31 First insulating layer
32 Second insulating layer
4 Sheath protective layer

The invention claimed is:
1. A flat cable, comprising:
a plurality of conductive thin plates of strip-shape arranged in parallel;
an insulating layer covering the conductive thin plates; and
a sheath protective layer covering the conductive thin plates covered with the insulating layer, wherein the conductive thin plate has a thickness of 0.6 mm or less and a cross-sectional width of 4 mm or more, the insulating layer has a thickness of 0.25 mm or more, the sheath protective layer has a thickness of 0.25 mm or more, and the flat cable is characterized by a total thickness of 3 mm or less and a cross-sectional total width of 20 mm or more, wherein the insulating layer comprises:
- a first insulating layer covering each of the plurality of conductive thin plates individually; and
- a second insulating layer covering the conductive thin plates individually covered with the first insulating layer.

2. The flat cable according to claim 1, wherein the second insulating layer is a layer made by extrusion molding on the plurality of conductive thin plates arranged in parallel.

3. The flat cable according to claim 1, wherein the first insulating layer is a resin covering having a thickness of 0.1 mm or less.

4. The flat cable according to claim 1, wherein the conductive thin plate is made of oxygen-free copper.

5. The flat cable according to claim 1, further comprising a carbon covering that covers an outside surface of the sheath protective layer.

* * * * *